United States Patent
Zhuang

(10) Patent No.: US 9,344,159 B2
(45) Date of Patent: May 17, 2016

(54) DYNAMIC MULTI-CELL CLUSTERING FOR DOWNLINK COMP IN A WIRELESS COMMUNICATION NETWORK

(71) Applicant: Telefonaktiebolaget L M Ericsson (publ), Stockholm (SE)

(72) Inventor: Jiandong Zhuang, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 280 days.

(21) Appl. No.: 14/049,814

(22) Filed: Oct. 9, 2013

(65) Prior Publication Data

US 2015/0099527 A1 Apr. 9, 2015

(51) Int. Cl.
*H04W 72/00* (2009.01)
*H04B 7/02* (2006.01)

(52) U.S. Cl.
CPC ..................................... *H04B 7/024* (2013.01)

(58) Field of Classification Search
CPC ..... H04W 16/00; H04W 16/02; H04W 16/04; H04W 16/06; H04W 16/08; H04W 16/10; H04W 16/12; H04W 16/14; H04W 16/28; H04W 24/02; H04W 28/02; H04W 28/08; H04W 28/12; H04W 28/16; H04W 28/18; H04W 28/24; H04W 28/26; H04W 36/00; H04W 36/02; H04W 48/10; H04W 48/12; H04W 72/00; H04W 72/02; H04W 72/04; H04W 72/06; H04W 72/08; H04W 72/10; H04W 52/0209; H04W 72/042; H04W 72/0473; H04W 40/24; H04W 52/365; H04B 7/24; H04B 7/024; H04B 7/0413; H04B 7/0452; H04B 7/0456; H04B 7/0482; H04B 7/0617; H04B 7/0652; H04B 7/0639; H04L 1/009; H04L 1/20; H04L 5/0048
USPC .................. 455/67.11, 450, 453, 501, 452.1; 370/230, 252, 280, 317, 328, 329, 332, 370/337, 338, 341
See application file for complete search history.

(56) References Cited

U.S. PATENT DOCUMENTS

2010/0056215 A1   3/2010  Gorokhov et al.
2010/0091893 A1*  4/2010  Gorokhov ............. H04L 1/0026
                                                     375/260

(Continued)

FOREIGN PATENT DOCUMENTS

EP    2 381 587 A1   10/2011
EP    2 747 478 A1   8/2012

OTHER PUBLICATIONS

International Search Report and Written Opinion dated Nov. 26, 2014 for International Application No. PCT/IB2014/063597, International Filing Date: Jul. 31, 2014 consisting of 12-pages.

(Continued)

*Primary Examiner* — Mahendra Patel
(74) *Attorney, Agent, or Firm* — Christopher & Weisberg, P.A.

(57) ABSTRACT

A method for generating at least one downlink CoMP cooperating set for downlink CoMP processing at a first node of a plurality of nodes in a network is provided. Each of the plurality of nodes managing at least one cell. A plurality of multi-dimensional UE points is determined. Each dimension of a respective multi-dimensional UE point corresponds to a channel quality metric value associated with a downlink signal received by the UE from a corresponding cell. At least one k-dimensional UE constellation is determined. Each k-dimensional UE constellation includes a set of UEs receiving downlink signals from k cells. At least one k-dimensional UE group is determined based on the determined at least one k-dimensional UE constellation. Each k-dimensional UE group is associated with the same cells. At least one downlink CoMP coordinating set is generated based on the plurality of k-dimensional UE groups.

19 Claims, 4 Drawing Sheets

(56) References Cited

U.S. PATENT DOCUMENTS

| | | | |
|---|---|---|---|
| 2011/0044193 A1 | 2/2011 | Forenza et al. | |
| 2011/0183669 A1* | 7/2011 | Kazmi | H04W 36/0083 |
| | | | 455/434 |
| 2011/0188393 A1* | 8/2011 | Mallik | H04B 7/024 |
| | | | 370/252 |
| 2011/0269459 A1* | 11/2011 | Koo | H04W 24/10 |
| | | | 455/434 |
| 2012/0087273 A1 | 4/2012 | Koo et al. | |
| 2012/0120866 A1* | 5/2012 | Cai | H04B 7/155 |
| | | | 370/315 |
| 2012/0135766 A1 | 5/2012 | Garavaglia et al. | |
| 2012/0172076 A1* | 7/2012 | Seki | H04B 7/024 |
| | | | 455/509 |
| 2012/0182946 A1 | 7/2012 | Chen et al. | |
| 2013/0250885 A1* | 9/2013 | Davydov | H04B 7/024 |
| | | | 370/329 |
| 2013/0343299 A1* | 12/2013 | Sayana | H04B 7/0417 |
| | | | 370/329 |
| 2014/0133325 A1* | 5/2014 | Prasad | H04B 7/024 |
| | | | 370/252 |

OTHER PUBLICATIONS

3GPP TSG RAN WG2 Meeting #66bis, R2-093727, Source: CATT, Title: Impact of CoMP on Control Plane, Agenda Item: 7.5, Document for Discussion, Los Angeles CA (USA), Jun. 29-Jul. 3, 2009 consisting of 5-pages.

3GPP TSG RAN WG1 Meeting #57bis, R1-092833, Source: CHTTL, Title: Discussions on CoMP Cooperating Set, Agenda Item: 15.2, Document for Discussion, Los Angeles CA (USA), Jun. 29-Jul. 3, 2009 consisting of 5-pages.

3GPP TSG RAN WG1 Meeting #58, R1-093586, Source: Hitachi Ltd., Title: Adaptive Cell Clustering for CoMP and Implementary Discussion, Agenda Item: 15.2, Document for Discussion/Acceptance, Shenzhen, China, Aug. 24-Aug. 28, 2009 consisting of 6-pages.

3GPP TSG RAN WG1 Meeting #68bis, R1-121124, Source: New Postcom, Title: Discussions on CoMP Set, Agenda Item: 7.5.1.1, Document for Discussion and Decision, Jeju, Korea, Mar. 26-30, 2012 consisting of 4-pages.

IEEE_Abstract_Papadogiannis_A_Dept_of Electron_Univ_of_York_York_UK_The_value_of_Dynamic_Clustering_of_Base_Stations_for_Future_Wireless_Networks Published in Fuzzy Systems (FUZZ), 2010 IEEE International Conference held on Jul. 18-23, 2010 consisting of 2-pages. [Retrieved from the Internet on May 31, 2013 at URL:<http://ieeexplore.ieee.org/xpl/articleDetails.jsp?tp=&arnumber=6489199&queryText%3Dclustering+group+of+users+in+downlink+comp].

Jingya_LI_Published_Thesis_on_Resource_Allocation_in_Downlink_Coordinate_Multi_Point_Systems Submitted to Communication System Group, Department of Signals and Systems, Chalmers University of Technology, Gothenberg Sweden Dec. 1, 2012 consisting of 48-pages. [Retrieved from the Internet on May 30, 2013 at URL:<http://publications.lib.chalmers.se/records/fulltext/169900/169900.pdf published in 2012.

International Search Report and Written Opinion dated Nov. 3, 2015 for International Application Serial No. PCT/IB2015/050883, International Filing Date—Feb. 5, 2015 consisting of 11-pages.

3GPP TSG-RAN WG1 #63bis, R1-110251, Dublin, Ireland, Source: Intel-Corporation Title: Coordinated-Multi-Point-Schemes_with_Centralized and Distributed Scheduling, Agenda Item: 6.3.1.2, Document for Discussion and Decision Jan. 16-22, 2011 consisting of 2-pages.

IEEE_Abstract_Papadogiannis_A_Dept_of Electron_Univ_of_York_York_UK_The_value_of_Dynamic_Clustering_of_Base_Stations_for_Future_Wireless_Networks Published in Fuzzy Systems (FUZZ), 2010 IEEE International Conference held on Jul. 18-23, 2010 consisting of 2-pages. [Retrieved from the Internet on May 31, 2013 at URL:< http://ieeexplore.ieee.org/xpl/articleDetails.jsp?tp=&arnumber=6489199&queryText%3Dclustering+group+of+users+in+downlink+comp].

IEEE_Abstract_Huan_Sun_etal_Dynamic Cell Clustering Design for Realistic Coordinated Multipoint Downlink Transmission_Published in Personal Indoor and Mobile Radio Communications (PIMRC), 2011 IEEE 22nd International Symposium held on Sep. 11, 2011 consisting of 2-pages. [Retrieved from the Internet on May 30, 2013 at URL: <http://ieeexplore.ieee.org/xpl/articleDetails.jsp?reload=true&arnumber=6139718.

Stancanelli_etal_Application_of_Dynamic_Clustering_into_CoMP_Systems Sep. 13, 2012 consisting of 5-pages. Simposio Brasileiro de Telecomunicacoes, Sep. 13-16, 2012, Brasilia, DF. [Retrieved from the Internet at URL: <http://sbrt.org.br/sbrt2012/publicacoes/98866_1.pdf.

IEEE_Abstract_Thiele_L_etal_User-Aided Sub-Clustering for CoMP Transmission: Feedback Overhead vs. Data Rate Trade-off Published in Signals, Systems and Computers (ASILOMAR), 2012 IEEE Conference Record of the Forty Sixth Asilomar Conference held on Nov. 4-7, 2012 consisting of 2-pages. [Retrieved from the Internet on Jun. 3, 2013 at URL:<http://ieeexplore.ieee.org/xpl/login.jsp?tp=&arnumber=6489199&url=http%3A%2F%2Fieeexplore.ieee.org%2Fxpls%2Fabs_all.jsp%3Farnumber%3D6489199.

Jingya_LI_Published_Thesis_on_Resource_Allocation_in_Downlink_Coordinated_Multi_Point_Systems Submitted to Communications Systems Group, Department od Signals and Systems, Chalmers University of Technology, Gothenberg Sweden Dec. 1, 2012 consisting of 48-pages. [Retrieved from the Internet on May, 30, 2013 at URL: <http://publications.lib.chalmers.se/records/fulltext/169900/169900.pdf published in 2012.

3GPP TR 36.814 3rd Generation Partnership Project; Technical Specification Group Radio Access Network; Evolved Universal Terrestrial Radio Access (E-UTRA); Further advancements for E-UTRA physical layer aspects (Release 9) consisting of 104-pages.

* cited by examiner

US 9,344,159 B2

DYNAMIC MULTI-CELL CLUSTERING FOR DOWNLINK COMP IN A WIRELESS COMMUNICATION NETWORK

TECHNICAL FIELD

The present invention relates to wireless communication, and in particular to a method and apparatus providing downlink coordinated multipoint (CoMP) cooperating sets for downlink CoMP processing.

BACKGROUND

As subscribers and network traffic in Long Term Evolution (LTE) based networks continue to grow, network providers are continually looking for ways to increase spectrum efficiency and user equipment (UE) throughput. One way of doing so is referred to as Downlink coordinated multipoint (CoMP). Downlink CoMP is one of LTE's advanced features that allows for mitigation of inter-cell co-channel interference to improve downlink spectrum efficiency and UE throughput of the LTE network. In particular, downlink CoMP has two main categories, namely, joint processing (JP) and coordinated scheduling and coordinated beamforming (CS/CB) in which joint processing includes joint transmission (JP/JT) and dynamic cell selection (JP/DCS). JP typically involves coordination between multiple nodes, e.g., eNodeBs, by making UE data available to each node in the coordination.

As a result, UE data needs to be delivered over the backhaul network to other coordinated eNodeBs for wireless transmission. For the JP/JT, data transmission is performed simultaneously at multiple nodes, thereby providing improved receive signal quality and strength for targeted UEs due to specially pre-coded data signals that constructively combine and enhance each other while undesired interference destructively cancel each other over the air. For JP/DCS, data transmission is performed by an individually selected eNodeB at a time, thereby providing improved received signal quality at the UE as well due to no interferences generated from neighboring eNodeBs during the transmission. In contrast, CS/CB requires UE data to be available only at the serving eNodeB. It typically involves transmission from a serving eNodeB to its served UE all the time, in which scheduling decisions and beam selection are coordinated in order to avoid interference. Therefore, scheduling and beam selection decisions need to be coordinated among multiple neighboring eNodeBs, which consumes a considerable amount of backhaul resources.

While the standardization of CoMP technology is still ongoing, downlink CoMP is still typically not available for practical use in current LTE networks due to the complexity and difficulty of implementation of the technology such as the backhaul signaling requirements as mentioned above, which is a significant issue. For example, typical downlink CoMP involves a substantial amount of multi-cell cooperative processing that causes backhaul signaling overhead and inter-cell communication to increase dramatically. The cost caused by the increase quickly becomes too large to be affordable from an implementation perspective, particularly when a large number of cells in the LTE network are involved in the cooperative process.

SUMMARY

The present invention advantageously provides a method, apparatus and system for conducting dynamic multi-cell clustering to create a coordinated multi-point, CoMP, coordinating set of cells and UEs in which downlink CoMP communications are performed.

According to one embodiment, a first node for generating at least one downlink coordinated multi-point, CoMP, cooperating set for downlink CoMP processing is provided. The first node forms at least one cell coverage area serving a plurality of user equipments, UEs, the first node includes at least one receiver in which the at least one receiver is configured to receive channel quality reports from the plurality of UEs. Each channel quality report includes at least one channel quality metric value associated with at least one downlink signal received by a corresponding UE. The first node further includes a processor configured to generate a channel quality list for each one of the plurality of UEs based on the channel quality reports. Each channel quality list includes the at least one channel quality metric value associated with the at least one downlink signal received by the corresponding UE. The processor is further configured to update each channel quality list by removing each channel quality metric value that does not meet a predefined channel quality threshold. The processor is further configured to group channel quality lists having at least the same quantity of channel quality metric values to generate a grouping of channel quality lists. The at least one receiver is further configured to receive a grouping of neighbor channel quality lists generated by at least a second node. The grouping of neighbor channel quality list groups UEs having a same quantity of channel quality metric values. The processor is further configured to generate at least one downlink CoMP cooperating set based at least in part on the grouping of channel quality lists and the grouping of neighbor channel quality lists.

In accordance with another aspect of this embodiment, the grouping of channel quality lists is further grouped by channel quality metric values associated with the same cells. The received grouping of neighbor channel quality lists is further grouped by channel quality metric values associated with the same cells. The channel quality metric value is a signal to interference plus noise ratio, SINR, value. The channel quality metric value is a reference signal receive quality, RSRQ, value. Each downlink CoMP cooperating set includes UEs having the same quantity of channel quality metric values associated with the same cells. Downlink CoMP processing is performed based at least in part on the at least one downlink CoMP cooperating set. Each downlink CoMP cooperating set includes UEs associated with at least two channel quality metric values representing downlink channel quality of two different cells. Downlink CoMP processing includes at least one of joint processing including joint transmission, JP/JT, and coordinated scheduling and coordinated beamforming, CS/CB. The first node is an evolved node B, eNodeB, in a long term evolution, LTE, wireless network.

According to another embodiment, a method for generating at least one downlink coordinated multi-point, CoMP, cooperating set for downlink CoMP processing at a first node managing at least one cell coverage area serving a plurality of user equipments, UEs, is provided. Channel quality reports from the plurality of UEs are received. Each channel quality report includes at least one channel quality metric value associated with at least one downlink signal received by a corresponding UE. A channel quality list is generated for each one of the plurality of UEs based on the channel quality reports. Each channel quality list includes the at least one channel quality metric value associated with the at least one downlink signal received by the corresponding UE. Each channel quality list is updated by removing each channel quality metric value that does not meet the predefined threshold. Channel quality lists having at least the same quantity of channel quality metric values are grouped to generate a grouping of channel quality lists. A grouping of neighbor channel quality lists from a second node is received. The grouping of neighbor channel quality lists groups UEs, served by the second node, having the same quantity of channel quality metric values. At least one downlink CoMP cooperating set is generated based at least in part on the grouping of channel quality lists and the grouping of neighbor channel quality lists.

In accordance with another aspect of this embodiment, the grouping of channel quality lists is further grouped by channel quality metric values associated with the same cells. The received grouping of neighbor channel quality lists is further grouped by channel quality metric values associated with the same respective cells. At least one downlink CoMP cooperating set is generated based at least in part on the grouping of channel quality lists associated with the first node and grouping of neighbor channel quality lists associated with the second node. Each downlink CoMP cooperating set includes UEs having the same quantity of channel quality metric values associated with the same cells. Downlink CoMP processing is performed based at least in part on the at least one downlink CoMP cooperating set. The channel quality metric value is a reference signal receive quality, RSRQ, value for a Long Term Evolution, LTE, system.

According to another embodiment, a method for generating at least one downlink coordinated multi-point, CoMP, cooperating set for downlink CoMP processing at a first node of a plurality of nodes in a network is provided. Each of the plurality of nodes manages at least one cell of a plurality of cells in the network. A plurality of multi-dimensional user equipment, UE, points of a first cell is determined. Each dimension of a respective multi-dimensional UE point corresponds to a channel quality metric value associated with a downlink signal received by the UE from a corresponding cell. At least one k-dimensional UE constellation is determined where k is a positive integer. Each k-dimensional UE constellation includes a set of UEs that receive downlink signals from k cells. At least one k-dimensional UE group is determined based in part on the determined at least one k-dimensional UE constellation. Each k-dimensional UE group is associated with the same cells. At least one downlink CoMP coordinating set is generated based at least in part on the plurality of k-dimensional UE groups.

In accordance with another aspect of this embodiment, downlink CoMP processing is performed based at least in part on the at least one downlink CoMP coordinating set. The channel quality metric value is a reference signal receive quality, RSRQ, value for an Long Term Evolution, LTE, system. UE related information is received in which the UE related information includes the at least one k-dimensional UE group from the plurality of cells other than the first cell. The at least one downlink CoMP coordinating set is based at least in part on the at last one k-dimensional UE group received from the plurality of cells other than the first cell. Each downlink CoMP coordinating set includes UEs associated with the same quantity of dimensions and the same cells. Downlink CoMP processing includes at least one of joint processing including joint transmission, JP/JT, and coordinated scheduling and coordinated beamforming, CS/CB.

The determining of a plurality of multi-dimensional UE points includes receiving channel quality reports from a plurality of UEs served by the first node. Each channel quality report includes at least one channel quality metric value associated with corresponding downlink signals received by the UE. A channel quality list is generated for each of the plurality of UEs served by the first node. Each channel quality list includes the at least one channel quality metric value associated with corresponding downlink signals received by the corresponding UE. Each channel quality list is updated by removing each channel quality metric value that does not meet a predefined channel quality threshold, each remaining channel quality metric value corresponding to a dimension of a respective multi-dimensional UE point. The first node is an evolved node B, eNodeB, in a long term evolution, LTE, wireless network.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
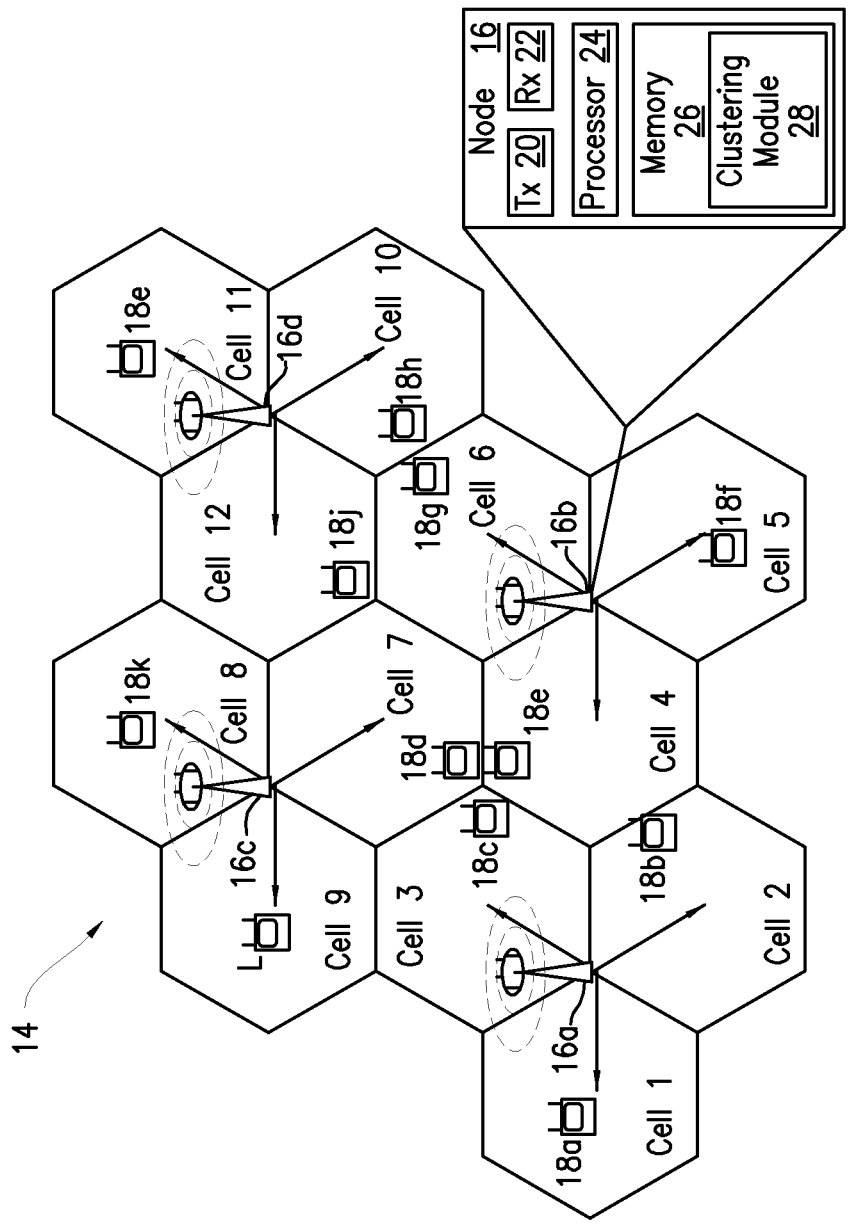
FIG. 1 is a block diagram of an exemplary communication system having coordinated multi-point multi-cell clustering construed in accordance with the principles of the present invention.

The present invention advantageously provides an apparatus, system and method for downlink CoMP multi-cell clustering. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description.

Referring now to drawing figures in which like reference designators refer to like elements there is shown in FIG. 1 an exemplary communication system having downlink CoMP multi-cell clustering functionality constructed in accordance with the principles of the present invention and designated generally as "14." System 14 includes one or more nodes 16a-16d (collectively referred to as "node 16"), one or more cellular coverage areas Cell 1-Cell 12 (collectively referred to as "wireless communication cell") and user equipments (UEs) 18a-18l (collectively referred to as "UE 18"). System 14 may support one or more communication protocols known in the art such as Internet Protocols along with Long Term Evolution (LTE) standards. One or more nodes 16 may communicate with one or more other nodes 16 via a backhaul network (not shown) that provides communications to/from nodes 16.

Node 16 may include one or more logical transmitters 20 (collectively referred to as "transmitter 20") and one or more logical receivers 22 (collectively referred to as "receiver 22") for communicating with UEs 18 and nodes 16. Transmitter 20 and/or receiver 22 may be associated with one or more antennas when they communicate with UEs 18 and one or more backhaul interfaces when they communicate with nodes 16. Node 16 also includes one or more processors 24 for performing node functions as described herein. Node 16 may be a base station such as an LTE eNodeB that provides and manages one or more wireless communication cells.

In particular, node 16 may manage several wireless communication cells or sectors to provide radio transmission services for UEs 18 distributed in system 14. For example, as illustrated in FIG. 1, each of nodes 16a-16d manages three wireless communication cells of system 14 with directional antennas pointing in different directions as indicated by respective arrows in each wireless communication cell of system 14. In one embodiment, full frequency reuse, i.e., frequency reuse factor of 1, is assumed throughout system 14 such that the same downlink/uplink carrier frequency is applied to every wireless communication cell of system 14 in the network (excluding carrier aggregation scenarios). To avoid intra-cell co-channel interference, the downlink/uplink in-band frequency resources are orthogonally shared by all UEs 18 served by a wireless communication cell of system 14 via a cell specific resource scheduler. Thus, as a side effect of full frequency reuse, it is not intra-cell but rather inter-cell co-channel interference that becomes a major factor that deteriorates the radio link quality of wireless communication cells of system 14 in the network. The inventive downlink CoMP processing helps reduce the effects of inter-cell co-channel interference.

Node 16 performs downlink CoMP operation such as JP including JP/JT, and CS/CB in which system 14 advantageously determines which wireless communication cells and UEs shall be chosen to form a CoMP cooperating set such that the increased signaling overhead and inter-cell communication of the CoMP operation becomes affordable for practical implementation, thereby helping reduce the negative effects of downlink inter-cell co-channel interference. Node 16 includes memory 26 that stores clustering module 28, among other modules. In particular, memory 26 may include non-volatile and volatile memory. For example, non-volatile memory may include a hard drive, flash memory, memory stick and the like. Also, volatile memory may include random access memory and others known in the art. Memory 26 may store program instructions such as those for clustering module 28. For example, clustering module 28 includes instructions, which when executed by processor 24, causes processor 24 to perform the per-cell clustering process, discussed in detail with respect to FIGS. 2-4. Referring to FIG. 1, node 16b will perform the clustering process for Cells 4-6 since node 16b manages these cells. Clustering module 28 can also be implemented in hardware such as through application specific integrated circuits (ASICs).

UE 18 may include one or more transmitters and receivers for communicating at least with node 16. For example, UE 18 may use communication protocols known in the art such as Internet Protocols along with LTE air interface protocols. UE 18 may include a memory and one or more processors that generally correspond to memory 26 and processor 24, with size and performance being adjusted based on design needs, while providing general UE 18 functionality as is well known in the art.

Figure 2:
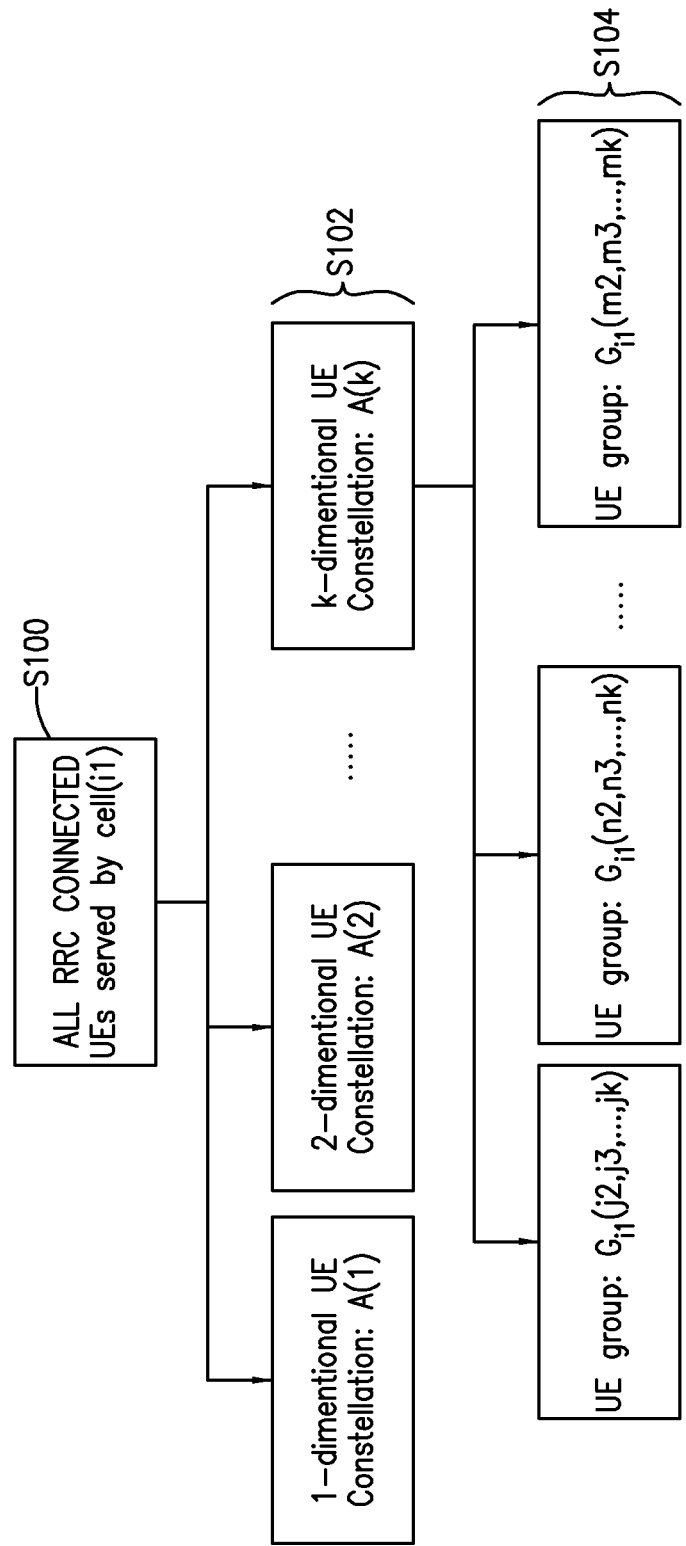
FIG. 2 is a chart of an exemplary UE classification after performing the user equipment grouping process in according of the principles of the present invention.

An exemplary multi-cell and UE grouping process performed for each wireless communication cell of system 14 is described with reference to FIG. 2. In particular, while FIG. 2 shows the creation of UE constellations and groupings for Cell ($i_1$), the process of FIG. 2 is also performed by Cell ($i_2$)-Cell($i_k$) where $i_1$-$i_k$ are global indices of respective wireless communication cells of system 14. As used herein, "multi-dimensional UE space" refers to all UEs in system 14 in which each dimension corresponds to a cell in system 14 and each multi-dimensional point in the space corresponds to a UE 18 associated with multiple cells via quality and strength of respective received downlink signals transmitted by the cells over the air. It is assumed that all UEs 18 in system 14 are Radio Resource Control Connected (RRC_Connected). As such, multi-dimensional UE points in the UE space are determined for all RRC_Connected UEs 18 served by a respective wireless communication cell 14, e.g., Cell($i_1$) (Blocks S100). For example, a multi-dimensional UE point is determined for each UE 18 with respect to each UE 18's serving wireless communication cell 14 in which each dimension of the UE point corresponds to the magnitude of a downlink measurement value or channel quality, e.g., SINR, of a downlink signal, received by UE 18 from its serving cell and/or at least one of the neighboring cells controlled by UE 18's serving node or one of neighboring nodes, i.e., from at least serving node 16 and possibly neighbor nodes 16. In other words, each UE 18 is represented by a point having a number of dimensions equal to the number of wireless communication cells 14 acting as sources of downlink signals that are detectable by UE 18, i.e., downlink signals received at UE 18 meeting a corresponding channel quality threshold, as determined based on channel quality reports, i.e., SINR reports, determined and transmitted by each UE 18 to its respective serving cell of node 16.

Equation 1 (shown below) represents a multi-dimensional UE point, i.e., a UE-specific SINR list for UE(n) based on SINR reports collected from the respective UE served by a respective wireless communication cell 14, e.g., Cell($i_1$). For example, in system 14, respective UE 18 may receive downlink signals from its serving cell as well as neighboring cells in which the respective UE 18 is responsible for reporting channel quality, i.e., SINR, values for each received downlink signals only to its serving cell via the uplink. Every RRC_CONNECTED UE 18 in Cell($i_1$) may have a corresponding UE specific information list created in accordance with clustering process for Cell($i_1$) to hold reported SINR values from each UE in Cell($i_1$). Each element in the list includes at least two pieces of information, one is the cell index of a cell measured by UE 18 and the other is the corresponding measured SINR value based on the cell-specific reference signal (CRS) received from a particular wireless communication cell 14, which may be the serving Cell($i_1$) or other neighboring wireless communication cells 14. Thus, if UE (n) represents an RRC_CONNECTED UE 18 with the global index of "n" that has reported to its serving Cell($i_1$) via an uplink feedback channel a set of downlink SINR values measured respectively from Cell($i_1$), Cell($i_2$), ... Cell($i_k$), then Equation 1 implemented by the serving cell Cell($i_1$) creates and holds a UE specific SINR list for UE(n), which can be mathematically expressed as $$L(n)=\{\text{SINR}(i_1), \text{SINR}(i_2), \ldots, \text{SINR}(i_k), \ldots\} \quad (1)$$

where $i_1, i_2, \ldots, i_k$ are the global wireless communication cell indices in the network for each wireless communication cell 14. For example, SINR($i_1$) corresponds to an SINR value of a downlink signal from Cell($i_1$) measured by UE 18 and SINR ($i_2$) corresponds to an SINR value of a downlink signal from Cell($i_2$) measured by UE 18 . . . , etc. Each SINR value corresponds to a dimension of a UE point. The list L(n) may be updated periodically with a time period T based on collected SINR reports from UE(n) in order to track time variations in SINR values, as discussed in detail below.

The SINR lists created for all RRC_CONNECTED UEs of Cell($i_1$) need to be sorted out in terms of reported SINR values in a descending order of quantity of reported SINR values. It is assumed that the cell indices $i_1, i_2, \ldots, i_k$ are reused to express corresponding ordered cell indices and Cell($i_1$) is still the serving wireless communication cell 14. In order to control an amount of control signalling overhead and inter-cell communication, a pre-set channel quality factor such as an SINR threshold denoted by $TH_{SINR}$ is defined and used to manage the size of each list by removing those SINR values from the list L(n) if they are less than $TF_{SINR}$, i.e., SINR values not meeting the channel quality threshold are removed from the list. This processing may result in that for different UEs 18, the sorted out SINR lists may have different lengths in terms of the number of SINR values remaining in the lists, i.e., the resultant list depends on SINR levels measured by a respective UE 18 relative to the predefined channel quality threshold. Thus, for UE(n), after application of the SINR threshold, L(n) may be truncated in length and denoted as $$L(n)_{THsinr} = \{SINR(i_1), SINR(i_2), \ldots, SINR(i_k)\} \quad (2)$$

where it is assumed that k (k=1, 2, 3, . . . ) SINR values meet the predetermined threshold and thus remain in the list.

As mentioned above, UEs can be looked at as multi-dimensional points in the UE space. Next, a UE partition in the space is achieved to form a number of first-level UE classes each having a particular number of dimensions called k-dimensional UE constellation, where k can be one, two, . . . , etc. Thus, UEs 18 having a corresponding channel quality (SINR) list with the same number of dimensions are grouped into each respective k-dimensional UE constellations, i.e., SINR/channel quality lists are grouped based on quantity of SINR values for UEs 18 served by their respective wireless communication cells of system 14 (Block S102). In other words, all RRC_CONNECTED UEs are classified, by their respective serving cell, into different dimensional UE constellations based on their respective SINR lists, i.e., $L(n)_{THsinr}$. For example, in FIG. 2, the classification into a k-dimensional UE constellation is performed by grouping together UEs 18 served by Cell($i_1$) and corresponding to a list $L(n)_{THsinr}$ which have k SINR values in their $L(n)_{THsinr}$ list. The outcome from Block S102 is a list of UE constellations denoted by A(k), each consisting of a set of UE(n) whose corresponding $L(n)_{THsinr}$ has the same k elements where k=1, 2, 3, . . . , that correspond respectively to the 1-dimensional UE constellation, 2-dimensional UE constellation, 3-dimensional UE constellation . . . , k-dimensional UE constellation, etc. For example, a one dimensional UE constellation, two dimensional UE constellation and three dimensional UE constellation in FIG. 2 can be denoted as:

$$A(1) = \{UE(n) : L(n)_{THsinr}(n) \text{ has one SINR element}\} \quad (3)$$

$$A(2) = \{UE(n) : L(n)_{THsinr}(n) \text{ has two SINR elements}\} \quad (4)$$

$$A(3) = \{UE(n) : L(n)_{THsinr}(n) \text{ has three SINR elements}\} \quad (5)$$

Applying the principle of multi-dimensional UE points in the UE space to FIG. 1, UEs 18a is grouped in a 1-dimensional UE class/constellation by serving Cell 1 because UE 18a is located near the center of Cell 1 and thus only downlink signals from serving Cell 1 meet a corresponding channel quality threshold assuming that downlink signals from other neighboring wireless communication cells are too weak to be detectable or meet the channel quality threshold due to large path losses. In another example, UE 18f is grouped in a 1-dimensional UE class/constellation by serving Cell 5 because UE 18f is located near the center of Cell 5 and thus only downlink signals from serving Cell 5 meet a corresponding channel quality threshold assuming that downlink signals from other neighboring wireless communication cells are too weak to be detectable or meet the channel quality threshold due to large path losses. UEs 18k and 18l are similarly grouped in a 1-dimensioanl UE class/constellation by their respective serving wireless communication cells because these UEs are located near the center of their respective serving wireless communication cells.

Applying the principle of multi-dimensional UE points in the UE space to FIG. 1, UEs 18b is grouped in a 2-dimensional UE class/constellation, i.e., constellation A(2), by serving Cell 2 because UE 18b receives downlink signals from serving Cell 2 and neighbor Cell 4 such that UE 18b has two respective wireless communication cells acting as sources of dateable downlink signals in the sense of meeting a corresponding channel quality threshold. Similarly, UEs 18g and 18h are grouped into 2-dimensional UE class/constellations by their respective serving cell since UEs 18g and 18h have two respective wireless communication cells acting as the sources of detectable downlink signals in the sense of meeting a corresponding channel quality threshold. For example, UE 18g receives detectable downlink signals from serving Cell 6 and neighboring Cell 10 while UE 18h receive detectable downlink signals from serving Cell 10 and neighboring Cell 6; therefore, UE 18g and 18h are grouped, by respective serving cells, into constellation A(2) that are individually performing Blocks S100-104, discussed in further detail with respect to FIGS. 3 and 4.

In another example, Cell 3 forms a 3-dimensional UE class/constellation that includes UE 18c in which UE 18c is a three dimensional UE point since there are three respective wireless communication cells acting as the sources of detectable downlink signals. For example, UE 18c receives detectable downlink signals from serving Cell 3 and neighboring Cell 4 and 7 because UE 18c is located near the borders among the three cells. Also, UE 18j receives detectable downlink signals from serving Cell 2 and neighboring Cell 6 and 7 since UE 18j is located near the boarders among three cells. The rest of the k-dimensional constellations can therefore be identified based on the number (k) wireless communication cells acting as sources of transmit downlink signals which are detectable, i.e., meet a predefined channel quality threshold, to other UEs, where k=1, 2, 3, . . . , and the grouping is performed for each wireless communication cell or cell($i_k$) with response to the served UEs. This approach works even in the case of irregular non-hexagonal wireless communication cells 14 as may be found in realistic networks.

Each k-dimensional UE constellation created or determined by a respective wireless communication cell is then further divided into one or more second-level UE groups called k-dimensional UE groups, i.e., grouping of SINR/channel quality lists, based on the principle that the UEs 18 included in a k-dimensional UE group must be associated with a same set of wireless communication cells, i.e., receiving downlink signals coming from a same set of cells including their serving cell and neighboring cells. Since each of UEs 18 is served by a respective wireless communication cell (Block S104), this further UE grouping is performed by processor 24 on a per-cell basis as well. In particular, processor 24 further groups each k-dimensional constellation into different UE groups denoted by $G(i_1, i_2, \ldots, i_k)$, where k=1, 2, 3, . . . and $i_1, i_2, \ldots, i_k$ are the associated global wireless communication cell indices. The classification into UE groups is determined based on which combination of wireless communication cells relate to each UE in A(k). The mathematical equation for forming $G(i_1, i_2, \ldots, i_k)$, can be expressed as:

$$G(i_1, i_2, \ldots, i_k) = \{UE(n): UE(n) \in A(k) \text{ and } L_{THsinr}(n) \text{ has the same combination } i_1, i_2, \ldots, i_k\} \quad (6)$$

where the same combination $i_1, i_2, \ldots, i_k$ signifies that the wireless communication cell indices, regardless of their order, are a unique combination rather than a permutation in A(k). In other words, each UE group $G(i_1, i_2, \ldots, i_k)$ is a subset of A(k) constellation and the union of all the $G(i_1, i_2, \ldots, i_k)$ can form the entire A(k) constellation.

Figure 3:
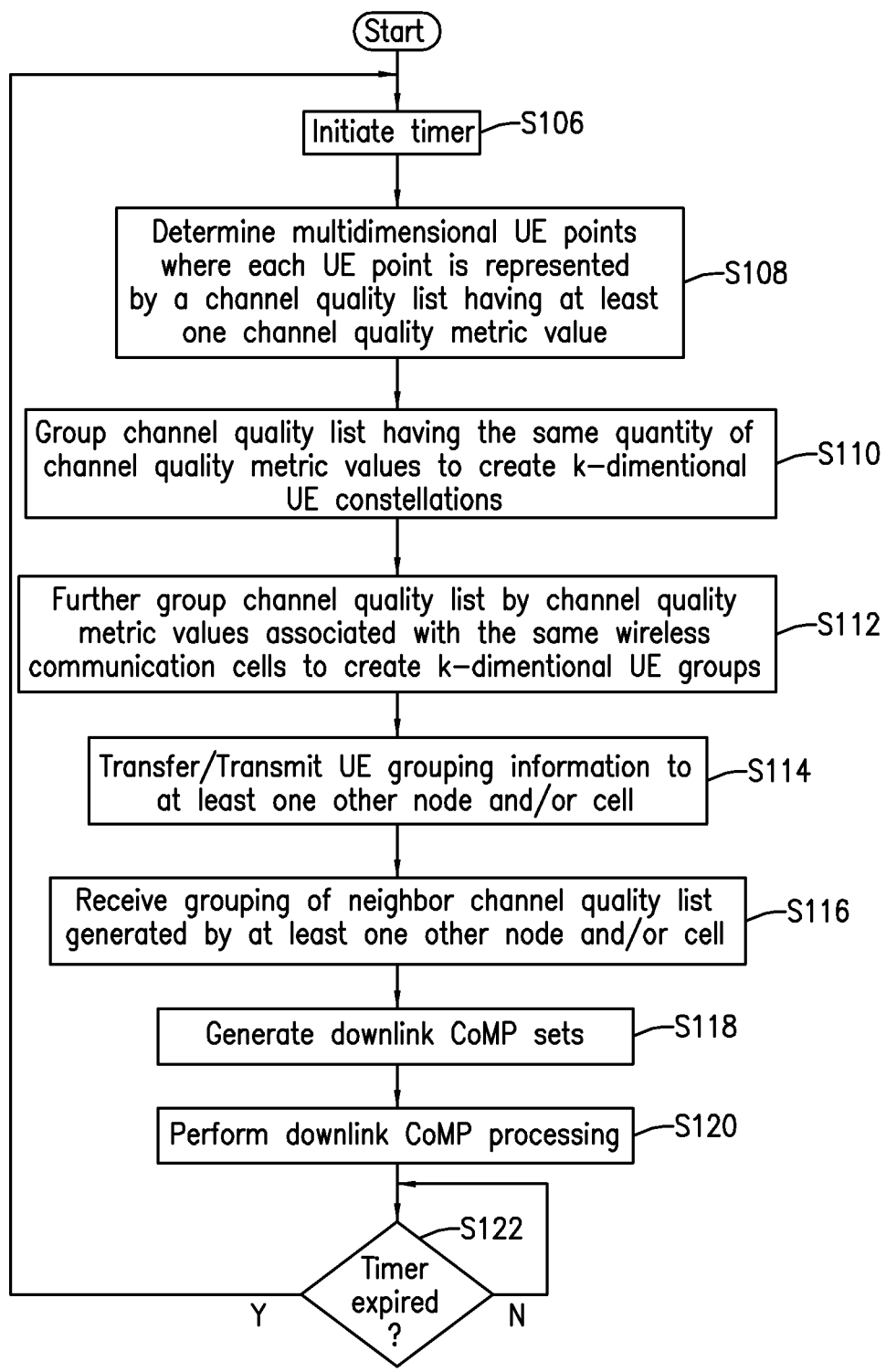
FIG. 3 is a flow chart of an exemplary multi-cell and UE clustering process in accordance with the principles of the present invention.

After generating the UE grouping in Block S104, each wireless communication cell such as cell($i_1$) performs inter-cell communication through backhaul interfaces in order to exchange UE-related information such as the UE groupings for multi-cell cooperative processing as will be discussed in detail with respect to Blocks S114 and S116 of FIG. 3. Other wireless communication cells that perform Blocks S100-S104 for all RRC_Connected UEs served by that respective wireless communication cell, e.g., Cell ($i_2$), Cell ($i_3$), etc., generate UE groups based on UEs 18 served by the respective wireless communication cell 14 and perform inter-cell communication in order to exchange UE related information. The UE related information may be transmitted to/from wireless communication cell using control signaling messages via the X2 interface between nodes 16. Each control signaling message will contain information about UE groups, i.e., $G(i_1, i_2, \ldots, i_k)$, at least including which UEs are included in each UE group and which wireless communication cells are related to the UE groups. The exchanging of UE related information is further discussed in detail with respect to FIG. 3.

An exemplary clustering process in accordance with the principles of the present invention is described with reference to FIG. 3. The clustering process is performed for each wireless communication cell in which the flow chart is described from the perspective of node 16 performing the clustering process for cell ($i_k$) for UEs served by Cell($i_k$). Processor 24 initiates a timer having a period of T where T is an adjustable system constant that can be varied based on UE distribution variation in the network, among other factors (Block S106). Using a timer having a period of T allows downlink CoMP coordinating sets to be updated every time period T, i.e., the clustering process of FIG. 2 is performed for each cell every time period T. In one example, if UE distribution variation in the network is high, then a system operator may set a time period T to a low value such that the downlink CoMP coordinating sets are updated more often, thereby capturing the varying UE distribution. However, if the UE distribution variation in the network is low, then the system operator may set the time period T to a high value such that the downlink CoMP sets are updated less often as UE distribution does not vary substantially. Moreover, the lower the time period T, the more often the control signaling overhead and inter-cell communication load will increase as the clustering process will be performed for each wireless communication cell each time period T. Therefore, timer period T is a system constant that may be dynamically set by system operators in order to choose an appropriate balance point of affordable control signaling overhead and inter-cell communication versus performance improvement gained from downlink CoMP operation.

Figure 4:
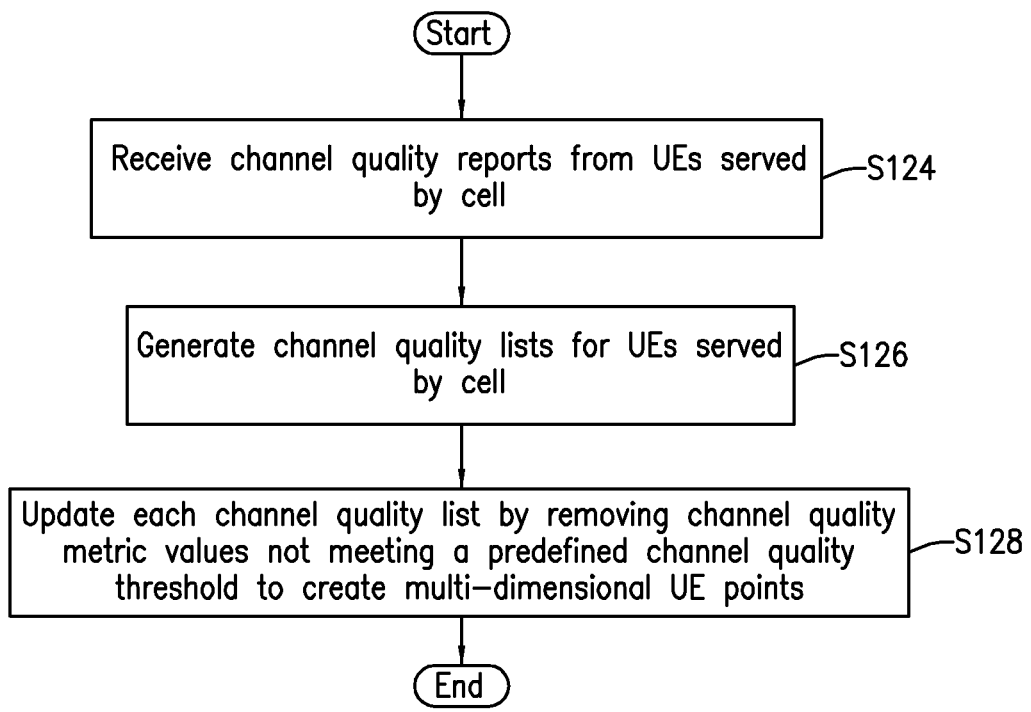
FIG. 4 is a flow chart of an exemplary user equipment point creation process in accordance with the principles of the present invention.

Processor 24 creates/determines multi-dimensional UE points for UEs served by cell ($i_k$) where each UE point is represented by a channel quality (i.e., SINR) list having at least one channel quality metric (i.e., SINR) value as described in further detail with respect to Block S100 and FIG. 4 that is a flow chart of the multi-dimensional UE points creation process (Block S108). Block S108 encompasses Blocks S124-S128. Processor 24 groups channel quality list having the same quantity of channel quality metric values for UEs served by a respective wireless communication cell to create and/or determine k-dimensional UE constellations for respective cell ($i_k$) based at least in part on the multi-dimensional UE points (Block S110). For example, constellation A(2) is determined for respective Cell 2 in which UEs 18 are served by Cell 2 having two SINR elements meeting the SINR threshold and associated with downlink signals from two wireless communication cells (including the serving wireless communication cell). Referring to FIG. 1, constellation A(2) of Cell 2 includes UE 18b that receives downlink signals from Cell 2 and Cell 4 in which Cell 2 does not have any other constellations as there are no other UEs 18 served by Cell 2. In another example, constellation A(1) of Cell 9 is determined in which UEs, i.e., UE 18l, having one SINR element meeting the SINR threshold and associated with downlink signals from a single wireless communication cell, i.e., serving Cell 9, are grouped together.

Processor 24 further groups channel quality lists by SINR values associated with the same wireless communication cells for UEs 18 served by a respective wireless communication cell/Cell($i_k$) to create and/or determine k-dimensional UE groups in which each group corresponds to a different combination of wireless communication cells irrespective of the sequence of the combination (Block S112). For example, at Cell 3, UE 18c is included in a 3-dimensional UE group that corresponds to UEs 18 served by Cell 3 that receive downlink signals from three cells, namely, Cell 3, 4 and 7, i.e., $G_3$ (4,7)={UE (c)}. In another example, with respect to Cell 7, UE 18d is included in a 3-dimensional UE group that corresponds to UEs 18 served by Cell 7 that receive downlinks signal from Cells 7, 3 and 4, i.e., $G_7$ (3,4)={UE (d)}. In other words, the grouping of channel quality lists by SINR values associated with the same wireless communication cells is done for UEs in each k-dimensional UE constellation. With reference to FIG. 1, each cell (k) may have the following respective local view of inter-cell co-channel interference with respect to UEs 18 served by respective wireless communication cells:

Cell (1): $G_1$={UE(a)}
Cell (2): $G_2$ (4)={UE(b)}
Cell (3): $G_3$ (4,7)={UE(c)}
Cell (4): $G_4$ (3,7)={UE(e)}
Cell (5): $G_5$={UE(f)}
Cell (6): $G_6$ (10)={UE(g)}
Cell (7): $G_7$ (3,4)={UE(d)}
Cell (8): $G_8$={UE(k)}
Cell (9): $G_9$={UE(l)}
Cell (10): $G_{10}$ (6)={UE(h)}
Cell (11): $G_{11}$={UE(i)}
Cell (12): $G_{12}$ (6,7)={UE(j)}

In particular, Cell 1 determines that UE 18a receives downlink signals from Cell 1 but Cell 1 is unaware of the local view of inter-cell co-channel interference with respect to UEs 18 served by other wireless communication cells. Cell 7 determines that UE 18d receive downlink signals from Cell 7, Cell 3 and Cell 4 but is unaware of the local view of inter-cell co-channel interference with respect to UEs 18 at other wireless communication cells. Processor 24 causes UE grouping information or UE-related information such as the UE groupings for multi-cell cooperative processing to be transferred/transmitted to at least one other node and/or cell in system 14 (Block S114). For example, the information exchange may be performed by the same node 16 where the information exchange is by the node internally such as when node 16 manages at least two wireless communication cells. In another example, the information exchange between cells 18 may be performed by transmitter 20 that transfers/transmits the UE-related information via inter-cell communication to another node 16, i.e., information exchanged is done externally via corresponding backhaul interfaces. Transmitting UE grouping information allows other nodes to become aware of the distribution of UEs 18 served by respective cells, thereby allowing other wireless communication nodes 14 to perform downlink CoMP processing based on the transmitted UE grouping information.

Node 16 corresponding to one or more wireless communication cells receives UE-related information such as a grouping of UEs from at least one other wireless communication cell and/or node via inter-cell communication on the backhaul network (Block S116). For example, other wireless communication cells of system 14 may be performing the clustering process of FIG. 3 such that the other wireless communication cells 14 transmit/transfers UE grouping information, i.e., Block S114, as determined by that respective wireless communication cell of system 14. The UE related information may include k-dimensional UE groups as determined by respective neighbor wireless communication cells performing the clustering process of FIG. 3. Through inter-cell communication between respective wireless communication cells, wireless communication cells become aware of the global network distribution of UEs served by respective wireless communication cells, which reflects possible distribution of inter-cell co-channel interference over these respective wireless communication cells if downlink co-channel signals are transmitted simultaneously to UEs 18. For example, referring to FIG. 1, after inter-cell communication is performed between nodes, i.e., Blocks S114 and S116, respective wireless communication cells have the following awareness of the global picture of inter-cell co-channel interference with respect to UEs 18:

Cell (1): $G_1=\{UE(a)\}$
Cell (2): $G_2(4)=\{UE(b)\}$
Cell (3): $G_3(4,7)=\{UE(c)\}, G_4(3,7)=\{UE(e)\}, G_7(3,4)=\{UE(d)\}$
Cell (4): $G_4(3,7)=\{UE(e)\}, G_3(4,7)=\{UE(c)\}, G_7(3,4)=\{UE(d)\}, G_2(4)=\{UE(b)\}$
Cell (5): $G_5=\{UE(f)\}$
Cell (6): $G_6(10)=\{UE(g)\}, G_{10}(6)=\{UE(h)\}, G_{12}(6,7)=\{UE(j)\}$
Cell (7): $G_7(3,4)=\{UE(d)\}, G_3(4,7)=\{UE(c)\}, G_4(3,7)=\{UE(e)\}, G_{12}(6,7)=\{UE(j)\}$
Cell (8): $G_8=\{UE(k)\}$
Cell (9): $G_9=\{UE(l)\}$
Cell (10): $G_{10}(6)=\{UE(h)\}, G_6(10)=\{UE(g)\}$
Cell (11): $G_{11}=\{UE(i)\}$
Cell (12): $G_{12}(6,7)=\{UE(j)\}$ Block S116 may be performed before, after or contemporaneously with one or more of blocks such as Blocks S108, S110, S112 and/or S114.

With reference to S118, processor 22 generates downlink CoMP cooperating sets based at least in part on the plurality of UE groups determined by the respective wireless communication cell, i.e., Cell $(i_k)$ and the UE related information received by the respective wireless communication cell, i.e., (Block S118). For example, processor 24 merges/clusters together UE groups as determined by Cell($i_k$) and other wireless communication cells based on wireless communication cell indices regardless of the ordering of wireless communication cell indices such that the downlink CoMP cooperating sets are formed.

Each CoMP cooperating set can be mathematically expressed as:

$$SET_{CoMP}(j_1,j_2,\ldots,j_k)=\{UE(n):U(n)\epsilon G_{j1}(j_2,j_3,\ldots,j_k)$$
which has the same combination $j_1,j_2,\ldots,j_k\}$ For example, with reference to cell $(i_1)$, UE related information received by cell($i_1$) from other cells indicates that one or more cells, i.e., cell($i_1$), cell ($i_2$), cell ($i_3$), . . . , and/or cell($i_k$), have UE groups which have the same combination of wireless communication cell indices irrespective of the order of the wireless communication cell indices. The UE groups are merged together to form a downlink CoMP cooperating set with related wireless communication cells. Respective downlink CoMP cooperating sets are formed for each wireless communication cell by respective one or more nodes 16. The downlink CoMP cooperating sets formed by each wireless communication cell of system 14 in FIG. 1 is as follows:

Cell(2): $SET_{CoMP}(2,4)=\{UE(b)\}$
Cell(3): $SET_{CoMP}(3,4,7)=\{UE(c), UE(d), UE(e)\}$
Cell(4): $SET_{CoMP}(3,4,7)=\{UE(c), UE(d), U(e)\}, SET_{CoMP}(2,4)=\{UE(b)\}$
Cell(6): $SET_{CoMP}(6,10)=\{UE(g), UE(h)\}, SET_{CoMP}(6,7,12)=\{UE(j)\}$
Cell(7): $SET_{CoMP}(3,4,7)=\{UE(c), UE(d), UE(e)\}, SET_{CoMP}(6,7,12)=\{UE(j)\}$
Cell(10): $SET_{CoMP}(6,10)=\{UE(g), UE(h)\}$
Cell(12): $SET_{CoMP}(6,7,12)=\{UE(j)\}$ For example, UE(g) and UE (h) are grouped into the same downlink coordinated CoMP set by Cells 6 and 10 since both UEs receive downlink signals from Cells 6 and 10, in which Cell 10 becomes aware of that UE(h) receives downlink signals from Cell 10 after inter-cell communication with Cell 6. For Cell (1), Cell (5), Cell (8), Cell (9) and Cell (11) there are no downlink CoMP cooperating sets generated due to each of them, as shown below, having only one wireless communication cell centered UE which is not affected by other wireless communication cells from an inter-cell co-channel interference perspective.

Cell (1): $G_1=\{UE(a)\}$
Cell (5): $G_5=\{UE(f)\}$
Cell (8): $G_8=\{UE(k)\}$
Cell (9): $G_9=\{UE(l)\}$
Cell (11): $G_{11}=\{UE(i)\}$ With the outcome of the above multi-cell clustering process, downlink CoMP processing such as JP/JT or CS/CB is performed with respective wireless communication cells of system 14 based at least in part on the downlink CoMP cooperating sets generated at Block S118 (Block S120). The function of Block S120 may be independent of the functions described in FIG. 3 as long as the required downlink CoMP coordinating sets generated by the instant invention are made available for processing. Processor 24 determines whether the timer has expired (Block S122). For example, processor 24 determines whether a predetermined amount of time, i.e., period T, has passed. If processor 24 determines the timer has not expired yet, i.e., a predefined amount of time has not passed, processor 24 repeats the determination of Block S122. If processor 24 determines the timer has expired, processor 24 performs Block S106 to start a new operation period. By using a timer of time period T, system 14 provides system operators with an adjustable system constant by which to be able to update SINR reports measured by respective UEs 18 timely and dynamically.

System 14 advantageously limits the amount of control signaling overhead and corresponding inter-cell communication traffic load required by downlink CoMP multi-cell processing by considering only a limited set of wireless communication cells and/or UEs in downlink CoMP multi-cell clustering. Further, the amount of control signaling overhead and corresponding inter-cell communication traffic load can be dynamically managed through one or more system constants such as a system constant corresponding to a predefined channel quality threshold, i.e., an SINR threshold $TH_{SINR}$. For example, system operators can adjust the overhead and traffic load by setting different channel quality threshold values. Setting the channel quality threshold to a high value will likely reduce the size of each noise list since fewer SINR values will meet this high threshold such that control signaling overhead and inter-cell communication load remains low. However, performance improvement gained from downlink CoMP operation may be compromised since there are less cell and UE 18 candidates getting involved in that downlink CoMP processing. Alternately, setting the channel quality threshold to a low value may increase the amount of control signaling overhead and inter-cell communication load as more SINR values are likely to be included in the noise lists, thereby increasing performance improvement gains of downlink CoMP processing. Also, time period T is another system constant that can be adjusted by the system operators in which the downlink CoMP coordinating sets are updated every time period T, i.e., the clustering process is performed for each cell every time period T.

System 14 advantageously allows network operators to make their own decision when adjusting the SINR threshold and/or time period T in order to choose an appropriate balance point of affordable control signaling overhead and inter-cell communication versus performance improvement gained from downlink CoMP operation, thereby allowing for the reduction of cost without sacrificing too much performance. Further, the method and system for performing downlink CoMP clustering is a distributed approach that can be implemented in a flat LTE network structure where there is no central control node between eNodeBs such that every wireless communication cell performs the same downlink CoMP clustering process, thereby allowing for easier implementation in real world networks.

System 14 is versatile in nature as well, in that the downlink CoMP clustering process can work with different types of downlink CoMP operation, including JP/JT and CS/CB. For example, when system 14 is working with JP/JT, system 14's downlink CoMP clustering forms various CoMP cooperating sets which consist of wireless communication cells acting as downlink transmitters and UEs acting as downlink receivers, and the corresponding produced cross cell precoded downlink signals transmit simultaneously over the same allocated frequency resources determined by a multi-cell scheduler operating in the way of JP/JT. When system 14's downlink CoMP clustering is working with CS/CB, compared to the case of JP/JT, the difference is that the corresponding cross cell precoded downlink signal transmission is UE specific, and proceeds separately over different frequency resource allocations determined by a multi-cell scheduler operating in the way of CS/CB.

FIG. 4 is a flow chart of an exemplary process for determining multi-dimensional UE points served by a respective wireless communication cell in accordance with the principles of the present invention. Receiver 22 receives channel quality, i.e., SINR, reports from UEs served by a respective wireless communication cell, Cell ($i_k$), and processor 24 processes or determines SINR reports which have been received from UEs 18 (Block S124). For example, a serving wireless communication cell receives channel quality reports or SINR reports via receiver 22 from UEs 18 served by that wireless communication cell in which the channel quality reports include SINR values measured, by UE 18, based on the CRS. Processor 24 generates a SINR list, L(n), for each UE 18 served by its serving wireless communication cell (Block S126). Processor 24 updates each SINR list by removing SINR values not meeting a channel quality threshold to create and/or determine multidimensional UE points (Block S128). For example, processor 24 generates updated SINR list, $L_{THsinr}(n)$, by removing SINR values from list, L(n), that are less than the predefined SINR threshold, $TH_{SINR}$. Each updated SINR list, $L_{THsinr}(n)$, corresponds to a UE point having one or more dimensions (SINR values) in which each point is then grouped into a corresponding constellation as discussed above with respect to Block S110 for subsequent processing as described with reference to FIG. 3.

The present invention can be realized in hardware, software, or a combination of hardware and software. Any kind of computing system, or other apparatus adapted for carrying out the methods described herein, is suited to perform the functions described herein. A typical combination of hardware and software could be a specialized or general purpose computing system having one or more processing elements and a computer program stored on a storage medium that, when loaded and executed, controls the computing system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computing program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A first node for generating at least one downlink coordinated multi-point, CoMP, cooperating set for downlink CoMP processing, the first node forming at least one cell coverage area serving a plurality of user equipments, UEs, the first node comprising:
at least one receiver, the at least one receiver configured to receive channel quality reports from the plurality of UEs, each channel quality report including at least one channel quality metric value associated with at least one downlink signal received by a corresponding UE;
a processor, the processor configured to:
generate a channel quality list for each one of the plurality of UEs based on the channel quality reports, each channel quality list including the at least one channel quality metric value associated with the at least one downlink signal received by the corresponding UE;
update each channel quality list by removing each channel quality metric value that does not meet a predefined channel quality threshold;
group channel quality lists having at least the same quantity of channel quality metric values to generate a grouping of channel quality lists;
the at least one receiver being further configured to receive a grouping of neighbor channel quality lists generated by at least a second node, the grouping of neighbor channel quality list grouping UEs having a same quantity of channel quality metric values; and the processor being further configured to generate at least one downlink CoMP cooperating set based at least in part on the grouping of channel quality lists and the grouping of neighbor channel quality lists.

2. The node of claim 1, wherein the grouping of channel quality lists is further grouped by channel quality metric values associated with the same cells.

3. The node of claim 2, wherein the received grouping of neighbor channel quality lists is further grouped by channel quality metric values associated with the same cells.

4. The node of claim 1, wherein the channel quality metric value is a signal to interference plus noise ratio, SINR, value.

5. The node of claim 1, wherein the channel quality metric value is a reference signal receive quality, RSRQ, value.

6. The node of claim 1, wherein each downlink CoMP cooperating set includes UEs having the same quantity of channel quality metric values associated with the same cells; and
the processor is further configured to perform of downlink CoMP processing based at least in part on the at least one downlink CoMP cooperating set.

7. The node of claim 6, wherein downlink CoMP processing includes at least one of joint processing including joint transmission, JP/JT, and coordinated scheduling and coordinated beamforming, CS/CB.

8. The node of claim 1, wherein each downlink CoMP cooperating set includes UEs associated with at least two channel quality metric values representing downlink channel quality of two different cells.

9. The node of claim 1, wherein the first node is an evolved node B, eNodeB, in a long term evolution, LTE, wireless network.

10. A method for generating at least one downlink coordinated multi-point, CoMP, cooperating set for downlink CoMP processing at a first node managing at least one cell coverage area serving a plurality of user equipments, UEs, the method comprising:
receiving channel quality reports from the plurality of UEs, each channel quality report including at least one channel quality metric value associated with at least one downlink signal received by a corresponding UE;
generating a channel quality list for each one of the plurality of UEs based on the channel quality reports, each channel quality list including the at least one channel quality metric value associated with the at least one downlink signal received by the corresponding UE;
updating each channel quality list by removing each channel quality metric value that does not meet the predefined threshold;
grouping channel quality lists having at least the same quantity of channel quality metric values to generate a grouping of channel quality lists;
receiving a grouping of neighbor channel quality lists from a second node, the grouping of neighbor channel quality lists grouping UEs, served by the second node, having the same quantity of channel quality metric values; and
generating at least one downlink CoMP set based at least in part on the grouping of channel quality lists and the grouping of neighbor channel quality lists.

11. The method of claim 10, wherein the grouping of channel quality lists is further grouped by channel quality metric values associated with the same cells.

12. The method of claim 10, wherein the received grouping of neighbor channel quality lists is further grouped by channel quality metric values associated with the same respective cells.

13. The method of claim 10, wherein each downlink CoMP cooperating set includes UEs having the same quantity of channel quality metric values associated with the same cells; and
the method further includes performing downlink CoMP processing being based at least in part on the at least one downlink CoMP cooperating set.

14. The method of claim 10, wherein the channel quality metric value is a reference signal receive quality, RSRQ, value for a Long Term Evolution, LTE, system.

15. A method for generating at least one downlink coordinated multi-point, CoMP, cooperating set for downlink CoMP processing at a first node of a plurality of nodes in a network, each of the plurality of nodes managing at least one cell of a plurality of cells in the network, the method comprising:
determining a plurality of multi-dimensional user equipment, UE, points of a first cell, each dimension of a respective multi-dimensional UE point corresponding to a channel quality metric value associated with a downlink signal received by the UE from a corresponding cell, determining the plurality of multi-dimensional UE points including:
receiving channel quality reports from a plurality of UEs served by the first node, each channel quality report including at least one channel quality metric value associated with corresponding downlink signals received by the UE;
generating a channel quality list for each of the plurality of UEs served by the first node, each channel quality list including the at least one channel quality metric value associated with corresponding downlink signals received by the corresponding UE; and
updating each channel quality list by removing each channel quality metric value that does not meet a predefined channel quality threshold, each remaining channel quality metric value corresponding to a dimension of a respective multi-dimensional UE point;
determining at least one k-dimensional UE constellation where k is a positive integer, each k-dimensional UE constellation including a set of UEs that receive downlink signals from k cells;
determining at least one k-dimensional UE group based in part on the determined at least one k-dimensional UE constellation, each k-dimensional UE group being associated with the same cells; and
generating at least one downlink CoMP coordinating set based at least in part on the plurality of k-dimensional UE groups.

16. The method of claim 15, further comprising performing downlink CoMP processing based at least in part on the at least one downlink CoMP coordinating set.

17. The method of claim 16, wherein downlink CoMP processing includes at least one of joint processing including joint transmission, JP/JT, and coordinated scheduling and coordinated beamforming, CS/CB.

18. The method of claim 15, wherein the channel quality metric value is a reference signal receive quality, RSRQ, value for an Long Term Evolution, LTE, system.

19. The method of claim 15, further comprising receiving UE related information including the at least one k-dimensional UE group from the plurality of cells other than the first cell; and
the at least one downlink CoMP coordinating set being based at least in part on the at last one k-dimensional UE group received from the plurality of cells other than the first cell, each downlink CoMP coordinating set including UEs associated with the same quantity of dimensions and the same cells.

* * * * *

UNITED STATES PATENT AND TRADEMARK OFFICE
CERTIFICATE OF CORRECTION

PATENT NO. : 9,344,159 B2
APPLICATION NO. : 14/049814
DATED : May 17, 2016
INVENTOR(S) : Zhuang It is certified that error appears in the above-identified patent and that said Letters Patent is hereby corrected as shown below:

On Title Page 2, item (56), under "OTHER PUBLICATIONS", in Column 2, Line 43, delete "od" and insert -- of --, therefor.

In the specification,

In Column 7, Line 5, delete "$TF_{SINR}$," and insert -- $TH_{SINR}$, --, therefor.

In Column 8, Line 61, delete "$i_k$)," and insert -- $i_k$) --, therefor.

In Column 11, Line 50, delete "processor 22" and insert -- processor 24 --, therefor.

In Column 11, Line 64, delete "$SET_{coMP}$" and insert -- $SET_{CoMP}$ --, therefor.

In Column 12, Line 3, delete "indices" and insert -- indices $i_1, i_2,...,i_k$ --, therefor.

Signed and Sealed this
Twenty-sixth Day of July, 2016

Michelle K. Lee
*Director of the United States Patent and Trademark Office*